United States Patent [19]

Fuchs et al.

[11] Patent Number: 4,526,383
[45] Date of Patent: Jul. 2, 1985

[54] LIP SEAL CONNECTED TO STIFFENING RING BY RUBBER-ELASTIC LAYER

[76] Inventors: Dieter Fuchs, Asternweg 8, 6086 Riedstadt-Crumstadt; Hans Ruhland, Ziegelhuettenstrasse 5, 6101 Reichelsheim, both of Fed. Rep. of Germany

[21] Appl. No.: 579,730

[22] Filed: Feb. 13, 1984

Related U.S. Application Data

[63] Continuation-in-part of Ser. No. 537,045, Sep. 29, 1983, abandoned.

[30] Foreign Application Priority Data

Mar. 17, 1983 [DE] Fed. Rep. of Germany ....... 3309538

[51] Int. Cl.³ .............................................. F16J 15/32
[52] U.S. Cl. .................................. 277/152; 277/166; 277/178
[58] Field of Search ............... 277/152, 153, 166, 134, 277/178

[56] References Cited

U.S. PATENT DOCUMENTS

| | | | |
|---|---|---|---|
| 2,476,324 | 7/1949 | Reich | 277/152 |
| 2,804,324 | 8/1957 | Stallings | 277/153 |
| 3,099,454 | 7/1963 | Walinski | 277/152 X |
| 4,131,285 | 12/1978 | Denton et al. | 277/152 X |
| 4,283,064 | 8/1981 | Staab et al. | 277/152 X |

FOREIGN PATENT DOCUMENTS

| | | | |
|---|---|---|---|
| 659296 | 3/1963 | Canada | 277/153 |
| 2801711 | 9/1978 | Fed. Rep. of Germany | 277/153 |
| 602746 | 6/1948 | United Kingdom | 277/152 |
| 962097 | 6/1964 | United Kingdom | 277/152 |
| 1478273 | 6/1977 | United Kingdom | 277/153 |

*Primary Examiner*—Robert S. Ward
*Attorney, Agent, or Firm*—Keil & Weinkauf

[57] ABSTRACT

Sealing device for rotating and for reciprocating machine parts, consisting of a stiffening ring with angular profile and a lipring, the lipring consisting of PTFE or a similar material, having a rotational section deflected in the direction of the sealed medium, as well as a holding section which is fixed relatively to the inwardly directed carrying web of the profile of the stiffening ring by means of a rubber-elastic, liquid- and gastight intermediate layer, the holding section, the carrying web and the intermediate layer being connected together as one piece, the layer having a thickness of at least 0.5 mm as well as a Shore A hardness of 65 to 85.

6 Claims, 4 Drawing Figures

LIP SEAL CONNECTED TO STIFFENING RING BY RUBBER-ELASTIC LAYER

This application is a continuation-in-part of our application Ser. No. 06/537,045, filed Sept. 29, 1983, and now abandoned.

BACKGROUND OF THE INVENTION AND PRIOR ART

The invention relates to a sealing device for rotating and for reciprocating machine parts, consisting of a stiffening ring with angular profile and a lipring, the lipring consisting of PTFE or a similar material, a rotational section deflected in the direction of the sealed medium, as well as a holding section which is fixed relatively to the inwardly directed carrying web of the profile of the stiffening ring by means of a rubber-elastic, liquid- and gastight intermediate layer.

Such a sealing device is known from French Patent Specification No. 1,338,110. There, the holding section of the lipring is immovably clamped, with the interposition of a rubber disk, between the inwardly directed web of the pressure ring, consisting of a stiff material, and the carrying web, likewise consisting of a stiff material, of the stiffening ring. This design is not only rather costly but in addition is unsatisfactory from an engineering standpoint.

Due to the rigid fixation of the holding section of the lipring its deformation resulting from the occurrence of radial oscillations of the shaft is concentrated on a very narrow range. This can lead, after only a short time, to an overload and can cause the portion carrying the sealing lip proper to be torn from the holding section, and this is tantamount to a complete failure of the sealing device. The mere presence of the rubber disk which is inserted as a seal does not significantly alter this result.

OBJECT AND SUMMARY OF THE INVENTION

The object of the invention is to further develop the sealing device of the aforementioned kind with a view to simplified manufacture and improved performance in operation.

This object is met in a sealing device of the initially mentioned kind in that the holding section, the carrying web and the intermediate layer of a rubber-elastic material are connected together as one piece and that the intermediate layer has a thickness of at least 0.5 mm and a Shore A hardness of 65 to 85.

In the proposed design the use of a pressring similar to that of French Patent Specification No. 1,338,110 is therefore obviated. In its stead the lipring is connected, through the intermediate layer of elastic material, in one piece with the inwardly directed carrying web of the stiffening ring. This does not only produce a non-releasable connection between the two parts but in addition guarantees, upon occurrence of radial displacements of the shaft, proper tightness of the transition zone as well as a particularly good resiliency of the sealing lip.

For the achievement of this result it is essential that the intermediate layer has a thickness of at least 0.5 mm, as well as a Shore A hardness of 65 to 85. If the thickness of the intermediate layer is less than the mentioned value or if the Shore A hardness is higher than the claimed range, then a similarly rigid fixation of the holding section of the lipring as in the case of the not very satisfactory design according to the French Patent Specification No. 1,338,110 will result. If the thickness of the intermediate layer, on the other hand, significantly exceeds the named value, for example by at least twenty times, then there results, the same as in the case of use of a rubber-elastic material of a Shore A hardness of less than 65, an insufficient guidance of the holding section of the lipring in the stiffening ring, and this will lead to leaking of the sealing lip after prolonged operation. In addition, the production of the parts is uneconomical.

The lipring of the proposed sealing device consists of PTFE or a similar material and it is produced by punching out of a circular disk from a plane sheet or by the cutting out of an annular disk with plane-parallel surfaces from a rotating hollow cylinder.

The inner diameter of the disk is smaller than the shaft diameter. The disks thus obtained are finished so as to make them more precise regarding their dimensions and regarding their surface quality and they are deflected centrally in an axial direction for the formation of the sealing lip. The latter is not dimensionstable but, because of the "memory effect" peculiar to the PTFE, it has the tendency to slowly re-form until it has been restored to the original plane shape. This tendency is retained over the long term, and it helps to insure that the sealing lip is sufficiently urged, for the entire duration of use, against the surface of the machine part to be sealed.

This tendency of the deflected portion to reset itself also reflects on the intermediate layer made of rubber-elastic material and having low relaxation constancy, by which the lipring is connected with the stiffening ring. If this intermediate layer has too much resiliency, deformations may occur which lead to a change of the setting angle of the sealing lip relatively to the surface of the sealed shaft. This would result in an unsatisfactory sealing performance.

The intermediate layer connecting the lip ring with the stiffening ring consists of an elastic material, preferably rubber. This layer may be adhesively attached to the lip ring and/or the stiffening ring, although this requires separate production. For economic reasons it has therefore been found to be more favorable to produce the intermediate layer in the course of a direct attaching operation and to simultaneously connect it by vulcanization with the stiffening ring and the lipring.

A favorable range for the thickness of the layer is 0.7 to 3 mm, preferably 0.9 to 1.4 mm. The hardness of the layer preferably is 70 to 80 Shore A, the ratio of its extent in radial direction to its thickness preferably being 3–7. The rubber-elastic material of the intermediate ring can be used, in addition to the attachment of the lipring to the stiffening ring, also to the formation of a protective lip on the side of the sealing lip facing away from the sealed medium. The outer cylindrical mantle of the carrying portion may be covered, to improve the seal in the bore, with the rubber-elastic material.

The lipring of the proposed sealing device can be provided, as far as its use as a radial shaft sealing ring is concerned, with hydrodynamically acting reconveying elements, for example with one or more rifling ribs and/or rifling grooves distributed over the circumference. These may be disposed on each of the two cone surfaces defining the sealing lip, that is on the cone surface facing the sealed medium as well as on the cone surface facing the surrounding air.

In addition, the sealing device, if correspondingly designed, may be used as a piston- as well as a rod-sealing device and, if so used, it insures excellent sealing results. In this case, several coaxial sealing lips may be provided in the range of the sealing zone in serial relationship as is well known from the state of the art.

BRIEF DESCRIPTION OF THE DRAWINGS

In the accompanying drawings a number of embodiments of the proposed sealing device have been shown, by way of example, in partial section.

There is shown in.

DETAILED DESCRIPTION OF THE PREFERRED EMBODIMENTS

Figure 1:
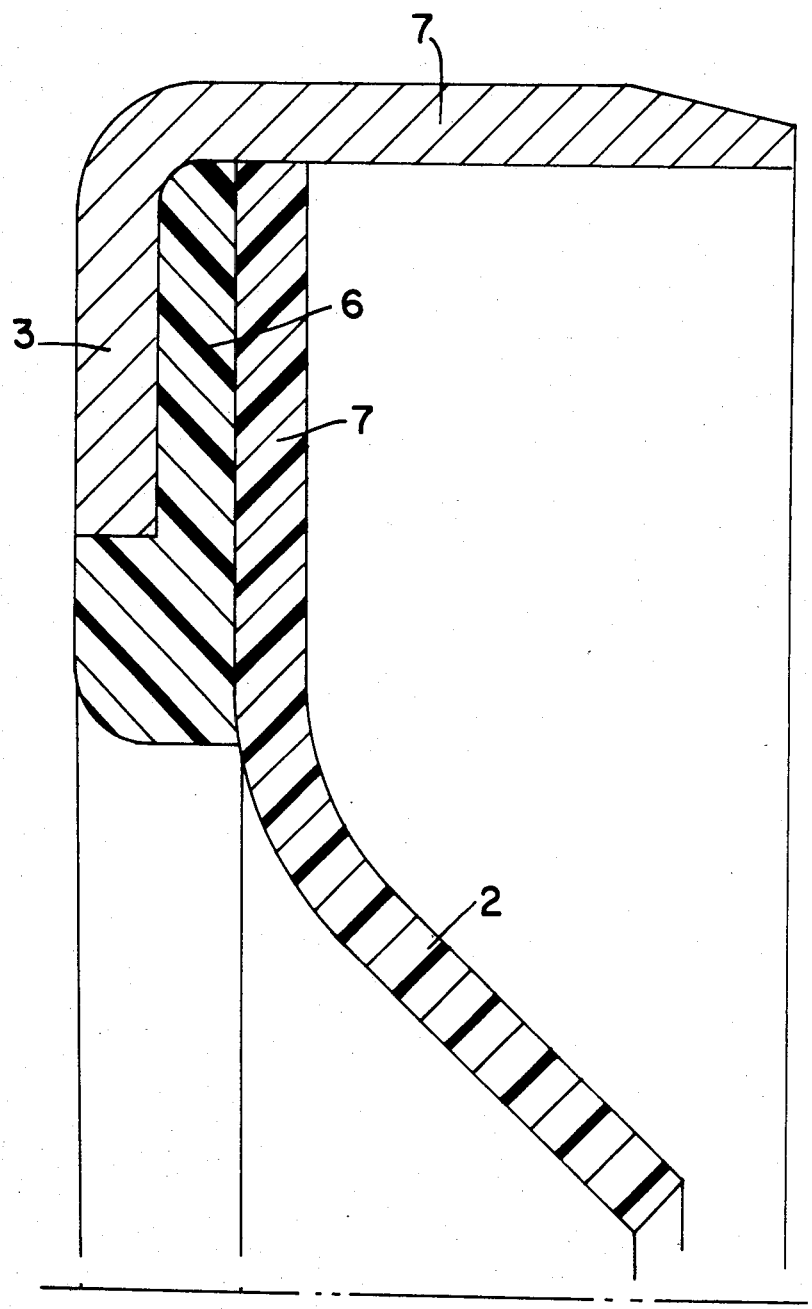
FIG. 1 a simple embodiment of the sealing device.

The illustrated embodiments contain a stiffening ring 1 with an annular profile and a web 3 which is radially inwardly directed. The stiffening ring consists of sheet steel.

The holding section 7 of lipring 2 is connected with the radially inwardly directed web 3 by means of the intermediate layer 6 of rubber-elastic material. The deformations of lipring 2 resulting from the occurrence of radial shaft displacements are distributed in this manner over a large range and are considerably reduced in their specific effect. An overload of the lipring which would adversely affect safe function, is no longer a danger in the proposed design. Lipring 2 consists of PTFE.

Figure 3:
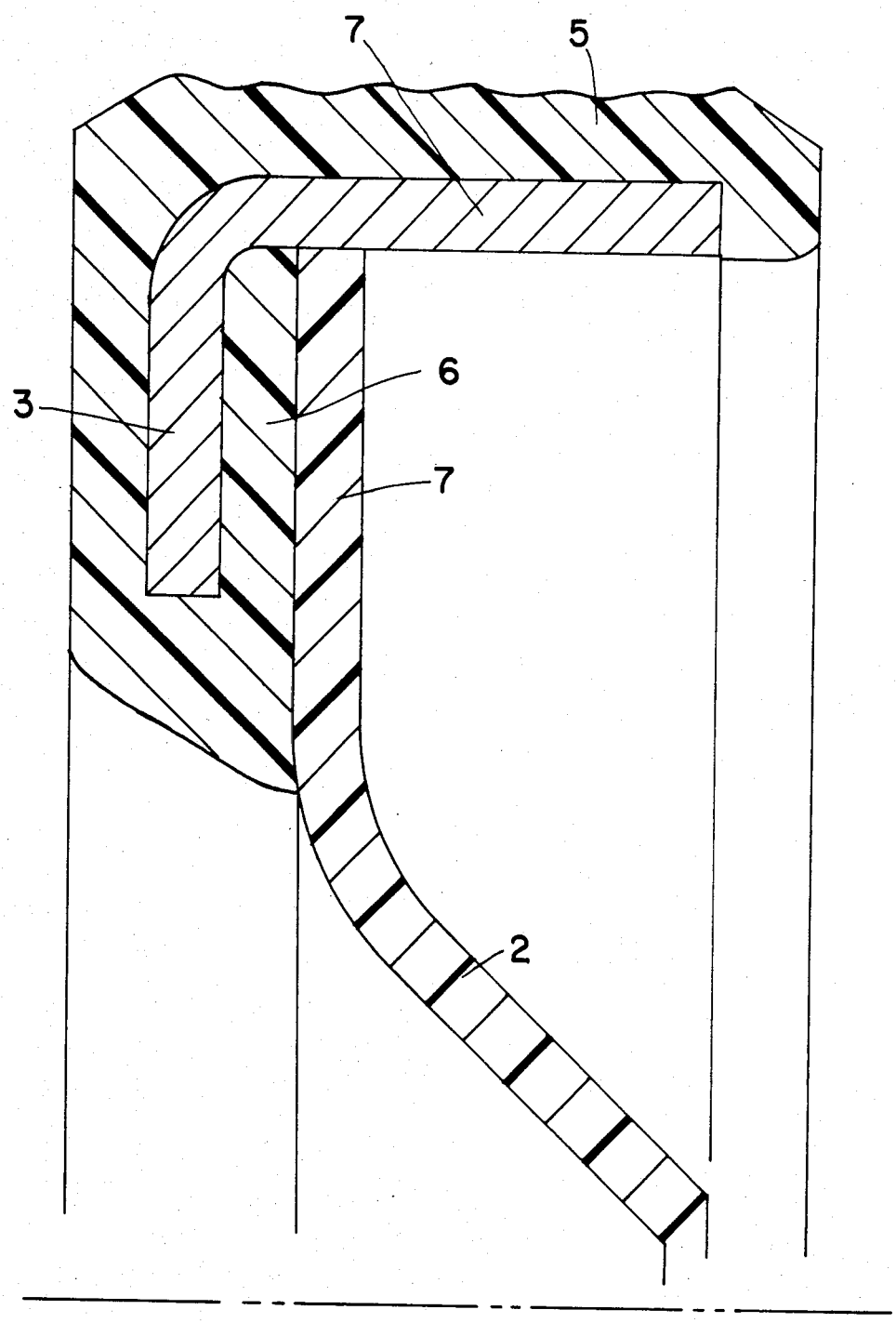
FIG. 3 the embodiment according to FIG. 1 supplemented by a layer of rubber covering the stiffening ring on the outside.
Figure 4:
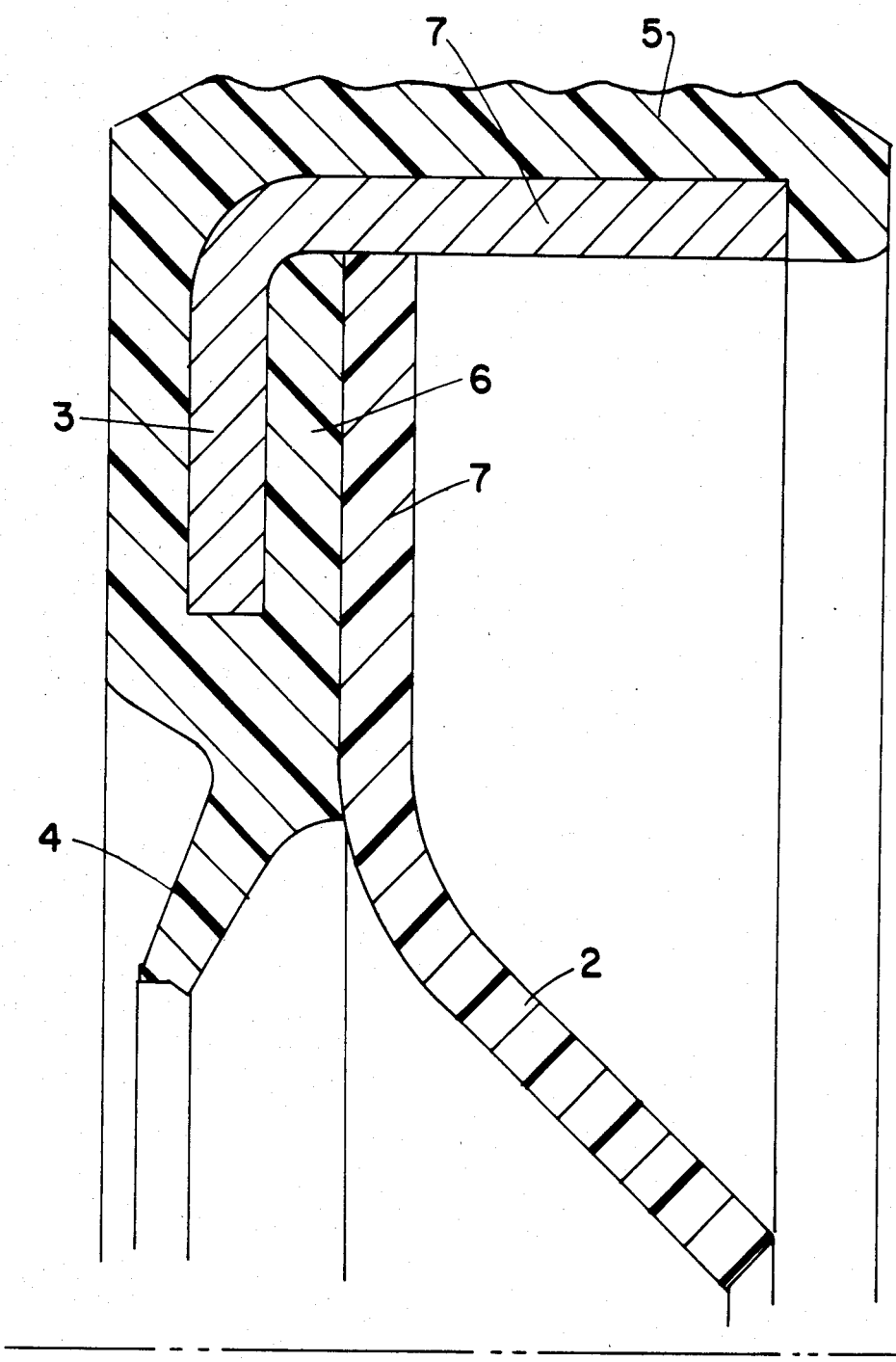
FIG. 4 an embodiment with the combined features of FIGS. 2 and 3.

In the embodiments of FIG. 3 and FIG. 4 the intermediate layer 6 of rubber which connects holding section 7 with carrying web 3 encompasses the stiffening ring on the outside as an integral layer 5.

In this manner the stiffening ring is given an additional corrosion protection and it is reliably sealed, also with respect to installation in divided housings, by the ribs which are disposed in axially series relationship.

Figure 2:
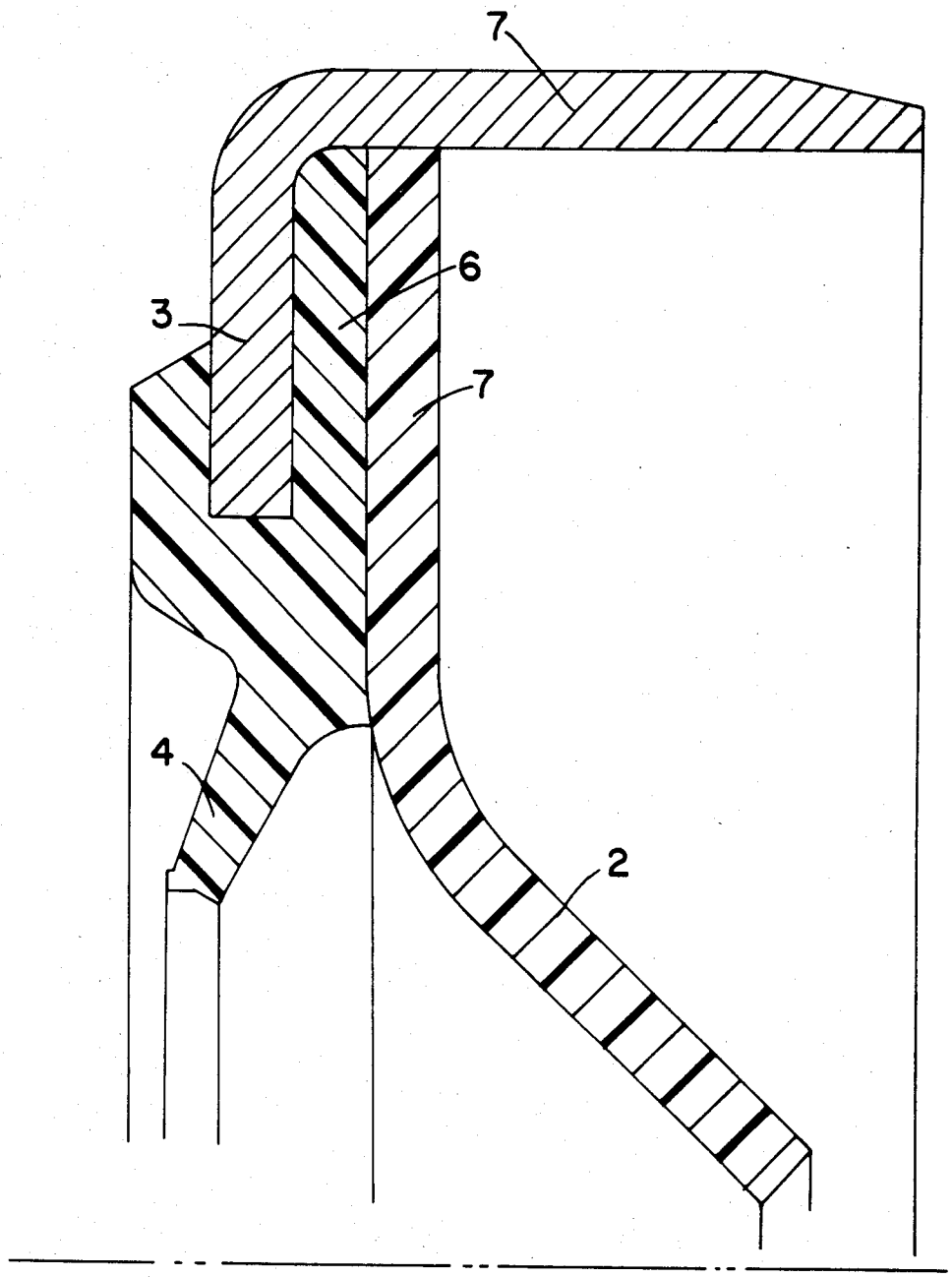
FIG. 2 the embodiment according to FIG. 1 supplemented by a protective lip.

In the embodiments according to FIG. 2 and FIG. 4 the layer is extended, on the outside of the stiffening ring, to a rotating protective lip 4 which bears under an elastic bias against the machine part, not shown, which is to be sealed. The protective lip prevents the lipring 2 which performs the sealing function proper, from being subjected to abrasively acting substances.

The described design is suited for example for the sealing of the crank shaft of a combustion engine. The radial displacements of the dynamically sealed zone occurring on each revolution do not adversely affect the sealing results. This is primarily due to the flexible mounting of the lipring on the holding ring.

This design combines, owing to the non-pressure-stressed mounting of the semiplastically deformed lipring of PTFE, by means of its holding section, on a layer of rubber which is stiffened on its rear and has a defined thickness and hardness, a good guidance of the sealing lip with great flexibility and elasticity.

What is claimed is:

1. A sealing device for rotating and for reciprocating machine parts, comprising
    a stiffening ring of angular profile having an inwardly directed carrying web,
    a lipring of non-elastomeric plastic material, said lipring having
    a freely inwardly extending lip section axially deflected in the direction of the sealed medium, and
    an outer, holding section, and
    a rubber-elastic, liquid- and gas-tight intermediate layer, the holding section of said lipring being fixed relatively to the carrying web of the profile of said lipring by means of said intermediate layer,
    wherein said carrying web and said intermediate layer are connected together as one piece, and
    wherein said layer has a thickness of at least 0.5 mm and a Shore A hardness of 65 to 85 and the ratio of the extent of the intermediate layer in radial direction to the thickness of said layer is 3 to 7.

2. A sealing device as claimed in claim 1, wherein the holding section, the carrying web and the intermediate layer are connected together by vulcanization.

3. A sealing device as claimed in claim 1 or 2, wherein the intermediate layer has a thickness of 0.7 to 3.0 mm.

4. A sealing device as claimed in claim 3, wherein the intermediate layer has a thickness of 0.9 to 1.4 mm.

5. A sealing device as claimed in claim 1 or 2, wherein the intermediate layer has a Shore A hardness of 70 to 80.

6. A sealing device as claimed in claim 1 or 2, wherein the entire surface of the carrying web is utilized for the attachment of said lipring.

* * * * *